UNITED STATES PATENT OFFICE.

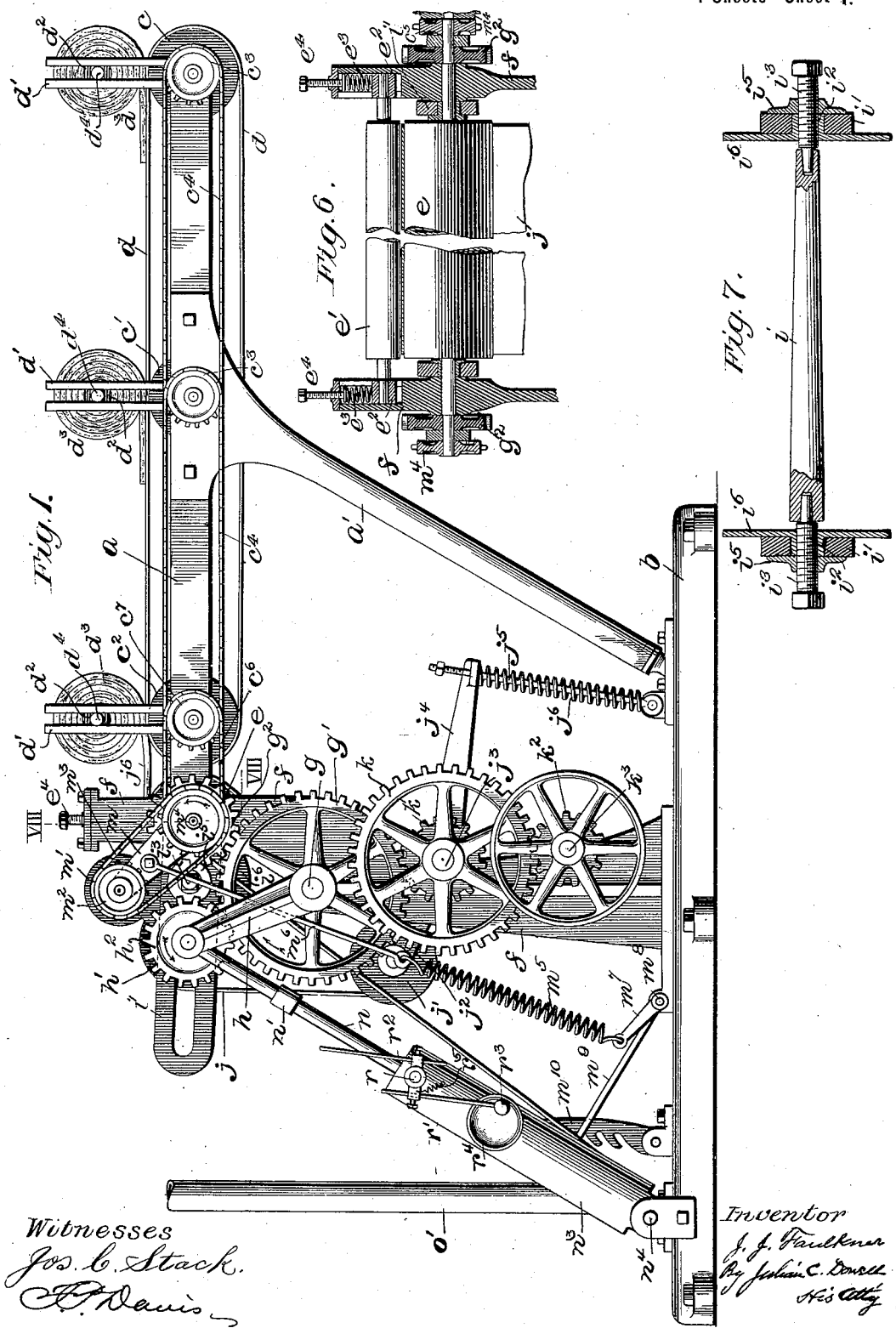
No. 636,380. Patented Nov. 7, 1899.
J. J. FAULKNER.
ROLLER BALING MACHINE.
(Application filed Mar. 14, 1899.)
(No Model.) 4 Sheets—Sheet 1.

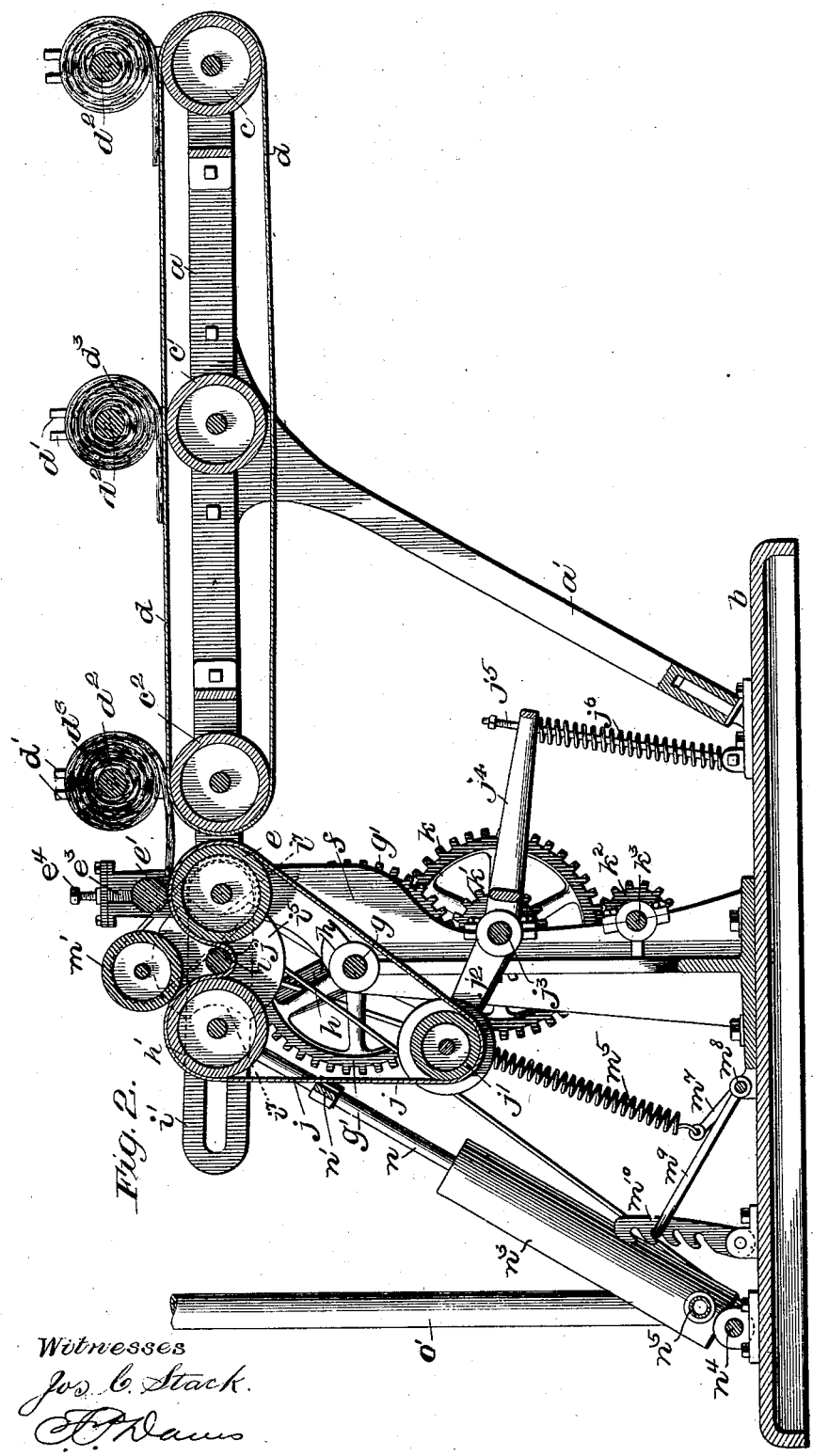

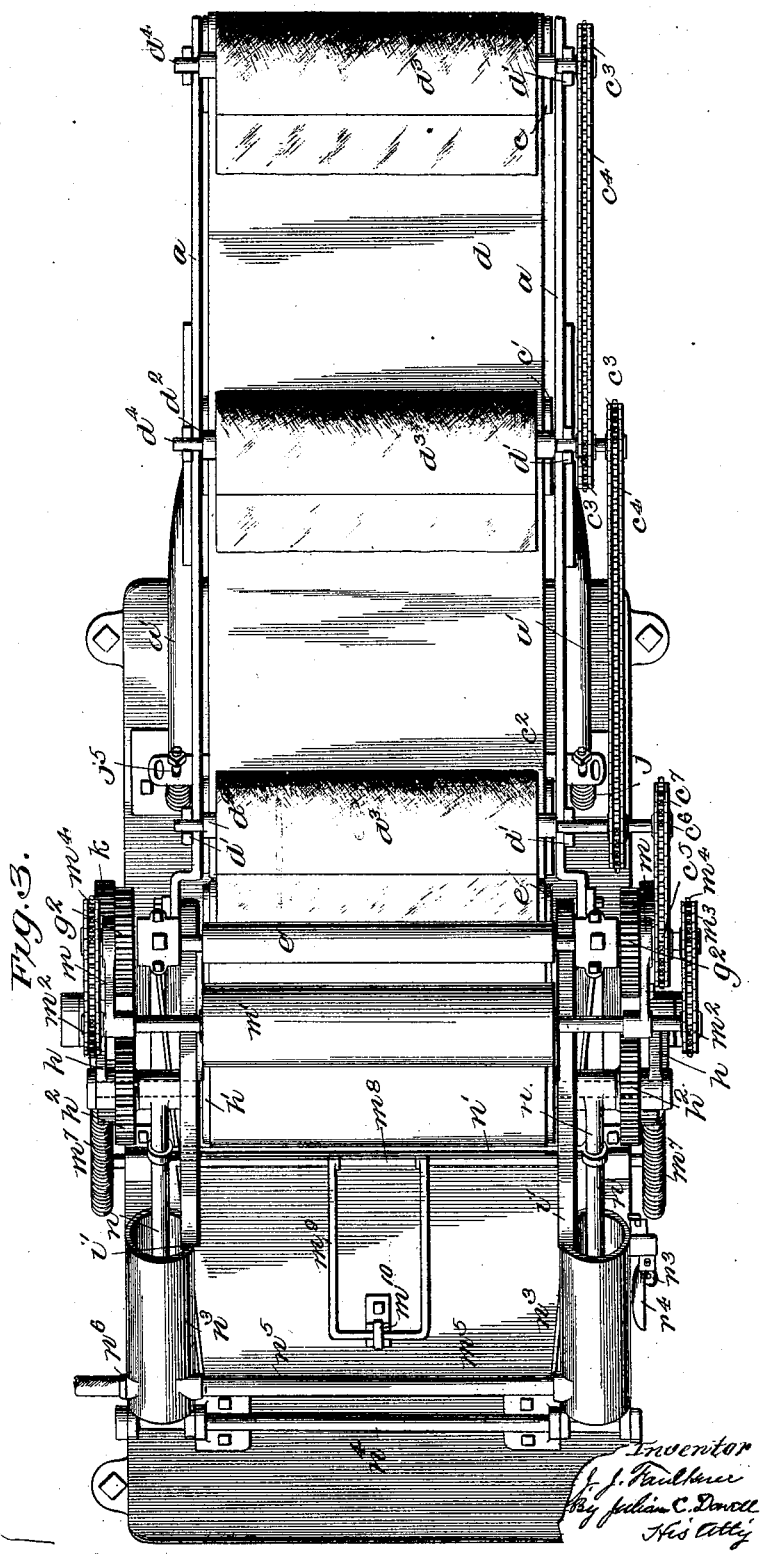

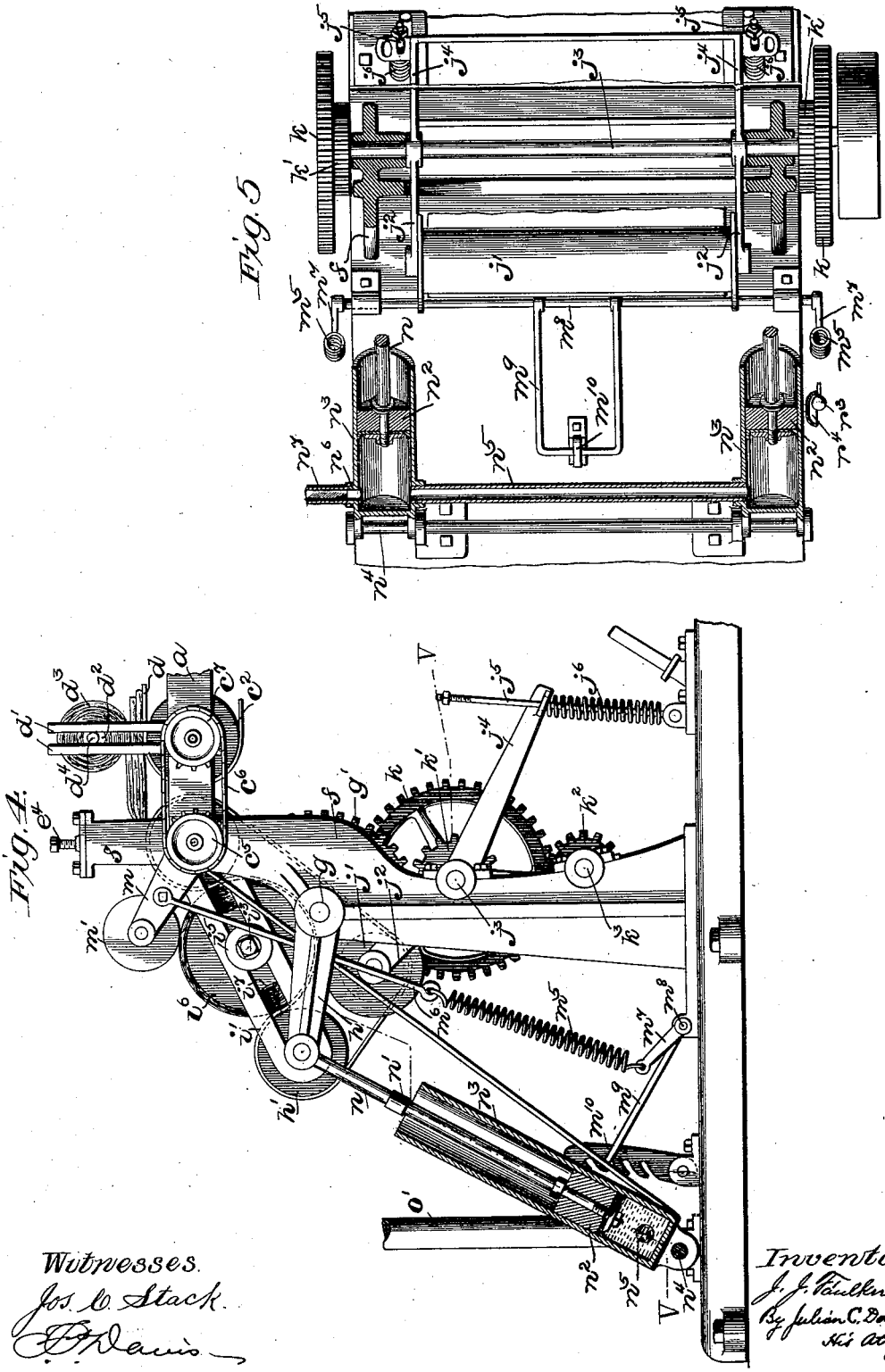

JAMES JONES FAULKNER, OF MEMPHIS, TENNESSEE, ASSIGNOR OF TWO-THIRDS TO W. S. BRIAN AND R. W. SPENCER, OF SAME PLACE.

ROLLER BALING-MACHINE.

SPECIFICATION forming part of Letters Patent No. 636,380, dated November 7, 1899.

Application filed March 14, 1899. Serial No. 709,067. (No model.)

*To all whom it may concern:*

Be it known that I, JAMES JONES FAULKNER, a citizen of the United States, residing at Memphis, in the county of Shelby and State of Tennessee, have invented certain new and useful Improvements in Roller Baling-Machines; and I do hereby declare the following to be a full, clear, and exact description of the invention, such as will enable others skilled in the art to which it appertains to make and use the same.

This invention relates to machines for baling cotton or other material in which the same is rolled up into a cylindrical form, sufficient pressure being exerted upon the material during the process of rolling to insure the required density and compactness of the product.

By my invention I propose to overcome certain difficulties which have been encountered in connection with prior machines and to produce an organized mechanism which is well adapted in every particular to the successful baling of cotton in cylindrical form. For one thing I propose to improve the method of feeding the material to the machine, so that the bale may be rolled up in layers having the thickness and density which best adapts it to the preparatory machinery of the spinner, and also having greater uniformity than heretofore possible. It has been customary in machines of this kind to feed the cotton directly from the gin or gin-condenser to the baling-machine, making a continuous operation of the ginning, condensing, and baling; but in such a method it has been found impractical to supply the cotton to the baling-machine in as thick or heavy a bat as is most desirable, owing to the fact that the necessarily-increased density of the cotton on the condenser so obstructs the air-currents which are relied upon to feed the cotton from the gin to the condenser as to result in clogging or choking the gin. Moreover, in the customary method above referred to, the operation of ginning, condensing, and baling being continuous, the gin and condenser must be made to run in unison with the baling-machine, and therefore while a completed bale is being removed from the machine it becomes necessary to stop the operation of the gin, involving a serious loss of time and consequent expense to the ginner. By my invention the cotton is not fed from the gin or the gin-condenser to the baling-machine directly, but is rolled up on suitable cores and in proper lengths under light pressure as it is doffed from the condenser, and lap-rolls thus produced can be stored and used as required, the arrangement of my baling-machine being such that the cotton can be fed to it by doffing it from a number of these lap-rolls. By thus employing a plurality of lap-rolls at once in connection with suitable doffing and feeding mechanism it will be understood that any desired thickness of bat for the bale can be had.

I further propose to improve the arrangement of means for rolling up the bale, whereby the power which is employed to do this also exerts itself to impose pressure upon the bale in proportion to the resistance to the rolling action. My improved arrangement of parts for rolling the bale also provides for greater facility in ejecting the finished bale.

Another novel feature of the invention consists in an arrangement for imposing a supplemental pressure and an auxiliary rolling action upon the bale, so as to hold the same in the compressed condition to which it is brought by the action of the main compressing means, thus relieving the latter of unnecessary work of recompression.

In connection with the improved arrangement of bale-rolling means my invention embraces novel core-controlling means whereby the core is kept in the plane of the axes of a pair of main compressing-rollers, while permitted to adjust itself centrally between them, although one of these rollers recedes from the other in the arc of a circle.

My invention also embraces a signal or alarm arrangement whereby upon the bale reaching a predetermined size the attendant is notified, so that uniformity in the bales may be insured.

In evolving the invention and embodying the ideas above expressed I have constantly had in view simplicity and strength of construction and the durability of the various parts of the machine, and above all the practicability of the entire organization.

With the above-stated objects in view the invention consists in certain novel constructions and combinations of parts, the essential elements of which are recited in the appended claims and preferred forms of embodiment of which are illustrated in the accompanying drawings and specifically described hereinafter.

Of said drawings, Figure 1 represents in side elevation a machine constructed in accordance with my invention, the parts being relatively positioned as when the bale is started. Fig. 2 represents the same in central vertical longitudinal section. Fig. 3 represents the machine in top plan view. Fig. 4 is a sectionalized side elevation of the central portion of the machine with the parts in the relative positions they assume as the bale is completed and with the gearing on the near side removed. Fig. 5 is a substantially horizontal section taken on line V V of Fig. 4. Fig. 6 is a broken sectional view taken on line VI VI of Fig. 1. Fig. 7 shows the core and appurtenances on an enlarged scale and in section.

Beginning at the feeding end of the machine, the letter $a$ designates a horizontal substantially rectangular frame which is supported at a suitable elevation by legs $a'$, removably engaged with studs on brackets secured to a suitable base $b$, the said frame supporting between its side bars a number of rollers $c$ $c'$ $c^2$, two at opposite ends of the frame and a third at an intermediate point. Sprocket-wheels $c^3$ are affixed to the journal of these rollers and sprocket-chains connect them, whereby all of the rollers may be driven in a direction to feed material into the press through driving connections hereinafter described. A feeding-apron $d$ passes around the end rollers $c$ and $c^2$ and above and below the middle roller $c'$, said apron receiving motion from the rollers and the layer of cotton or the cotton-bat being adapted to lie over the upper stretch of this apron and to pass therefrom into the machine.

At each side of the frame $a$ upright guides are arranged, there being one of such guides at each end of each of the rollers and each guide comprising arms $d'$, forming between them a slot extending radially of the roller and being open at its upper end. Wooden cores $d^2$ of lap-rolls $d^3$ are provided with trunnions $d^4$, which engage the said slots of the vertical guides, and these lap-rolls rest by gravity upon the apron $d$ immediately over the rollers, respectively, as clearly shown in Fig. 2. The traveling apron doffs the laps from the rolls, and by employing a number of these lap-rolls at once it will be seen that a bat of considerable thickness can be formed for the press by superimposing the laps. Thus I am enabled to obtain the desired result of making the bale in layers of the thickness required for the preparatory machinery of the spinner, while at the same time the ginning operation is not obstructed for it is not necessary to conform it to the operations of the press, but the cotton lap doffed from the condenser can be rolled up on wooden cores and stored away for use in the press as required.

The frame of the feeding mechanism is suitably engaged with upright side pieces $f$ of the frame of the press, and the reference-letter $e$ designates a compressing-roller which is mounted in stationary bearings on said uprights and occupies a position adjacent to the feeding-roller $c^2$, so that the bat of cotton can readily pass from the apron $d$ onto the upper side of the said compressing-roller. A small pressure-roller $e'$, located immediately above said roller $e$, is journaled in boxes $e^2$, (see Fig. 6,) fitted to slide in vertical slots in the uprights $f$ and pressed downwardly by springs $e^3$, whose tension is regulated by adjusting-bolts $e^4$, the said small roller preliminarily compressing the bat of cotton as it is received from the apron. The frame-uprights $f$ have bearings for a shaft $g$, on which are keyed large spur-gears $g'$, meshing with pinions $g^2$, affixed on the opposite ends of the journal of the compressing-roller $e$, and through this gearing said roller is rotated in a direction to roll up the bale. The journal of said roller $e$ also has affixed to it a sprocket-wheel $c^5$, connected by a chain $c^6$ with a sprocket-wheel $c^7$, affixed to the journal of the feed-roller $c^2$, whereby motion in the proper direction is imparted to the feeding-rollers and apron. A pair of arms $h$, journaled upon the shaft $g$, are formed at their outer ends with bearings for the journal of a compressing-roller $h'$, between which and the roller $e$ the bale is formed, the said compressing-roller $h'$ being provided with pinions $h^2$, which mesh with the gears $g'$, so as to be driven thereby while at the same time permitted to partially revolve around the same, after the manner of sun-and-planet gearing.

It will here be noted that in order to rotate the roller $h'$ in a direction to wind the bale it is necessary that the gears $g'$ rotate in the opposite direction, and hence in the direction that the swinging supports of the roller $h'$ would be constrained to move in order to apply pressure to the bale, and hence resistance to the rotation of the roller $h'$ in a direction to wind the bale results in converting the rotating force into a pressing force.

Of course as the bale grows between the compressing-rollers $e$ and $h'$ the latter swings downwardly and away from the roller $e$, and as it is desired to keep the center of the bale in the same plane with the axes of the two compression-rollers the following arrangement is adopted for supporting a core $i$, on which the bale is formed: Arms $i'$ are pivoted on the journal of the stationary compressing-roller $e$, said arms being slotted for the greater portion of their length and embracing the journal of the roller $h'$. These slotted arms constitute guides for boxes $i^2$, fitted to the slots so as not to turn in the same and being formed with screw-threaded bores receiving bolts $i^3$, whose inner ends constitute centers for the core, which is tapered from end to end and socketed for rotary engagement with said centers, as shown in Fig. 7. Said boxes have secured to or formed with them flanges or plates $i^5$, which extend over the outer sides of the said slotted arms, and plates or disks $i^6$, extending over the inner sides of said arms, these latter plates effecting the desired flat formation of the ends of the bale and being notched at opposite sides, as shown at $i^7$, so that when the two compressing-rollers are close together their journals will be accommodated in such notches. (See dotted lines, Fig. 2.) It will be seen that by this arrangement whatever may be the position of the swinging roller $h'$ the core will always be in the same plane as the axes of the two compressing-rollers and is also free to assume a central position between the rollers.

An endless apron $j$ passes around the compressing-rollers $e$ and $h'$ and under the core $i$ and also under a flanged tensioning-roller $j'$, which is journaled in forward-extending arms $j^2$ of a frame centrally pivoted upon a shaft $j^3$, its rearward-extending arms $j^4$ having perforated side flanges embracing rods $j^5$, pivoted to the brackets on the base $b$, so as to accommodate themselves to the movements of the pivoted frame and constituting guides for spiral springs $j^6$. These spiral springs exert themselves to depress the roller $j'$, and thereby tighten the apron, and it will be seen that the endless apron thus arranged coöperates with the compressing-rollers in forming the bale, a bight being produced in the apron, in which bight the core is positioned and the bale rolled up.

The shaft $j^3$, upon which the pivoted frame is mounted, carries gear-wheels $k$, having compounded with them pinions $k'$, meshing with the spur-gears $g'$, respectively, and the said gears $k$ are in mesh with pinions $k^2$ on a driving-shaft $k^3$, which receives motion from any suitable source of power.

Arms $m$ are pivoted upon the journal of the stationary compressing-roller $e$ and are formed at their outer ends with bearings for the journal of a supplemental or auxiliary roller $m'$, whose journal carries sprocket-wheels $m^2$, connected by chains $m^3$ with sprocket-wheels $m^4$, affixed to the journal of the stationary compressing-roller $e$. Spiral springs $m^5$, coupled through rods $m^6$ with the arms $m$ and connected at their lower ends with arms $m^7$ on a rock-shaft $m^8$, exert themselves to depress the said roller $m'$, and said rock-shaft is journaled in bearings upon the base $b$ and has a lever in the form of a loop $m^9$, adapted to be engaged by a rack-bar $m^{10}$, which is pivoted to a bracket on the base $b$. Said rack-bar is formed with a sufficient number of teeth to provide for any degree of pressure required to be exerted by the said spiral springs in depression of the auxiliary roller.

The main pressure, which is exerted upon the bale in the formation of the same, is supplied through the following agencies: Plunger-rods $n$ are formed at their upper ends with sleeves, which embrace the journal of the roller $h'$ at opposite ends thereof, the said rods being connected together by a cross-bar $n'$ and having plungers $n^2$ at their lower ends within cylinders $n^3$, which are affixed to a shaft $n^4$, journaled in bearings upon the base $b$, and are connected together for fluid communication by means of a pipe $n^5$. One of these cylinders communicates by a nipple $n^6$ with a flexible pipe $n^7$, said flexible pipe communicating with a stand-pipe $o'$, in which there is a column of water extending to a considerable height.

In the operation of the machine, the parts being in the relative positions shown in Figs. 1 and 2 and a number of lap-rolls having been put in place over the feed-apron, the latter will doff the laps and feed them superimposed, forming a comparatively thick layer or bat of cotton between the apron $j$, where it lies over the stationary compressing-roller $e$, and the preliminary pressure-roller $e'$ thereabove, the said layer of cotton thence being conveyed by said apron under the core $i$ and pressed against the same and caused to wind thereon between two compressing-rollers in the bight of the endless apron. It will be seen that from the very beginning the layer of cotton will have pressure imposed upon it by the two compressing-rollers and the said apron, and that thereafter each convolution of the bale is subjected to increasing pressure. As the bale grows the bight in the apron increases against the resistance of the spiral springs $j^6$, associated with the pivoted frame $j^2$ $j^4$, and the outward and downward movement of the roller $h'$ is resisted by the hydraulic column, while at the same time the frictional resistance of the belt to the rotation of the compressing-roller $h'$, said belt acting in the nature of a brake, tends to convert the force which is applied to rotate said roller into a force to press the latter against the bale. Therefore it will be seen that the layer of cotton is thoroughly compressed as it is rolled into the form of a cylindrical bale, and is, moreover, prevented from loosening on the upper side by reason of the pressure imposed upon it by the upper roller $m'$, and of course the apron prevents the loosening of the bale on the lower side, so that no recompression by the rollers is necessary, and the machine is thus relieved of unnecessary strain.

By mounting the receding compressing-roller so that it moves downward and forward ejectment of the finished bale can be more effectively accomplished, for when the core-centers are retracted and the bight jerked out of the apron the bale will be tossed away from the machine.

I have provided an arrangement whereby when the bale reaches a predetermined size an alarm will be sounded, such arrangement comprising a lever pivoted to one side of one of the ram-cylinders, as shown at $r$, and having adjustable arms $r'$ and $r^2$, one carrying a bell-clapper $r^3$ and the other projecting for engagement with the teeth of one of the pinions of the roller $h'$, so that when the latter is moved to a certain position the teeth of said pinion will encounter the lever-arm and cause a vibration of the same, and consequently a striking of the clapper against a bell $r^4$, which is properly mounted upon the ram-cylinder. A spring $r^5$ may be employed to normally hold the lever in a position where the clapper bears against one side of the bell. Upon the sounding of the alarm the attendant stops the machine, closes the valve $p$, and retracts the core-centers, so that the bale will be ejected, and to prevent any obstruction by the upper roller $m'$ the rack $m^{10}$ can be readily disengaged from the loop $m^9$, so as to relieve the upper roller of spring-pressure.

It will be seen that a machine constructed and assembled as above described and as illustrated in the accompanying drawings is well adapted to fulfil the objects primarily stated; but of course it is to be understood that the construction shown is susceptible of a great many variations without in any manner departing from the spirit or scope of the invention, and therefore in the claims which follow I have recited the essential elements of the invention without limitation to any particular form of construction.

Having thus fully described my invention, what I claim as new, and desire to secure by Letters Patent of the United States, is—

1. In a roller baling-machine, the combination with a pair of opposed compressing-rollers between which the bale is formed, one of said rollers being curvilinearly movable toward and from the other, of a core between said rollers, and core-supports extending rectilinearly between journals of the rollers and engaging the same with provisions for maintaining diametrical relation thereto under different relative positions of the rollers, whereby the core is maintained in the plane of the axes of the rollers.

2. In a roller baling-machine, the combination with a pair of opposed compressing-rollers between which the bale is formed, one of said rollers being curvilinearly movable toward and from the other, of a core between said rollers, and core-supports extending rectilinearly between journals of the rollers and engaging the same with provisions for maintaining diametrical relation thereto under different relative positions of the rollers, the supports affording slideways for the core in alinement with the journals of the rollers, whereby the core is maintained in the plane of the axes of the rollers.

3. In a roller baling-machine, the combination with a pair of opposed compressing-rollers between which the bale is formed, one of said rollers being curvilinearly movable toward and from the other, of a core between said rollers, and slotted core-supports extending rectilinearly between the journals of the rollers and engaging the same, the slots providing for the maintenance of diametrical relation of the supports to the rollers under different relative positions of the latter, whereby the core is maintained in the plane of the axes of the rollers.

4. In a roller baling-machine, the combination of a compressing-roller in stationary bearings, an opposed compressing-roller in a swinging support, a core between said rollers, and slotted arms constituting core-supports, said arms being pivoted concentric with the axis of one of the rollers and their slotted portions embracing the journals of the other roller, substantially as and for the purpose described.

5. In a roller baling-machine, the combination of a compressing-roller in stationary bearings, an opposed compressing-roller in a swinging support, a core between said rollers, and slotted arms pivoted concentric with the axis of one of the rollers, their slots accommodating the journals of the other roller and also affording slideways for the core.

6. In a roller baling-machine, the combination of a compressing-roller in stationary bearings, an opposed compressing-roller in a swinging support, a core between said rollers, and slotted arms constituting core-guides, said arms being pivoted concentrically with the axis of the stationary roller, and embracing the journals of the swinging roller.

7. In a roller baling-machine, the combination of a compressing-roller in stationary bearings, an opposed compressing-roller in a swinging support, a core between said rollers, core-guides pivoted concentrically with the axis of the stationary roller and engaged with the swinging roller whereby said core is maintained at all times in a plane embracing the axes of the two rollers, an apron passing over said rollers and under the core, tensioning means applied to the apron, and driving mechanism connected with the rollers.

8. In a roller baling-machine, the combination with a pair of opposed compressing-rollers between which the bale is formed, one of said rollers being curvilinearly movable toward and from the other, of a core between said rollers, core-guiding means engaged with the latter whereby the core is maintained in the plane of the axes of the rollers, an apron passing over said rollers and under said core, and tensioning means applied to said apron.

9. In a roller baling-press, the combination of a compressing-roller journaled in a movable support and having a gear, a stationarily-journaled gear meshing therewith and rotating the roller in a direction to roll up the bale by movement in the pressure-applying direction of movement of the movable support for the roller, whereby resistance to rotation of the latter results in application of pressure by the rotating force, and frictional resistance means in the nature of a brake applied to said roller and operating to oppose rotation thereof and thus cause the roller to exert pressure against the bale.

10. In a roller baling-press, the combination of a compressing-roller journaled in a movable support and having a gear, a gear meshing therewith and rotating the roller in a direction to roll up the bale by movement in the pressure-applying direction of movement of the movable support for the roller, whereby resistance to rotation of the latter results in application of pressure by the rotating force, an apron on suitable supports and passing around said roller, and tensioning means applied to said apron.

11. In a roller baling-machine, the combination of a pair of compressing-rollers one movable toward and from the other and pressed toward the same, a core between said rollers in a plane embracing their axes, means for maintaining said core in such relation to the compressing-rollers during the formation of the bale, a third roller arranged to press against the latter as it forms, means for driving all of said rollers, an apron passing over the pair of compressing-rollers and under the core, and tensioning means applied to said apron.

12. In a roller baling-machine, the combination of a pair of compressing-rollers between which the bale is formed one of said rollers being movable toward and from the other and pressed toward the same, a third roller arranged to press against the bale as it forms, and journaled in a support which is pivoted concentrically with one of said pair of rollers, and driving mechanism connected with all of said rollers.

13. In a roller baling-machine, the combination of a centrally-located spur-gear, a stationarily-journaled compressing-roller having a gear in mesh with the latter, a supplemental roller journaled in a support pivoted concentrically with said pressure-roller and geared thereto, and a compressing-roller movable toward and from the first-named roller and pressed toward the same and geared to the spur-gear.

14. In a roller baling-machine, the combination of a pair of compressing-rollers between which the bale is formed one of said rollers being journaled in a swinging support and pressed toward the other, a core in guides maintaining it in the plane of the axes of said rollers while permitting its self-adjustment, a central spur-gear concentric with the pivot of said swinging-roller support, gears on the two rollers in mesh with said central spur-gear, and a supplemental roller journaled in a support pivoted concentrically with one of the first-named rollers and geared thereto.

15. In a roller baling-machine, the combination of a pair of compressing-rollers between which the bale is formed one of said rollers being journaled in a swinging support and pressed toward the other, a core in guides maintaining it in the plane of the axes of said rollers while permitting its self-adjustment, a central spur-gear concentric with the pivot of said swinging-roller support, gears on the two rollers in mesh with said central spur-gear, a supplemental roller journaled in a support pivoted concentrically with one of the first-named rollers and geared thereto, an apron passing over the pair of pressure-rollers and under the core, and tensioning means applied to said apron.

16. In a roller baling-machine, the combination of a compressing-roller in a swinging support, a pivoted ram-cylinder and a plunger-rod pivotally embracing the journal of said roller and having a plunger within the cylinder.

17. In a roller baling-machine, the combination of a compressing-roller in a swinging support, a pivoted ram-cylinder, a plunger-rod pivotally connected with said roller and having a plunger within the cylinder, a hydraulic column, and a flexible pipe connecting said column with the cylinder.

18. In a roller baling-machine, the combination of a driving spur-gear, a compressing-roller journaled in a support pivoted concentrically with said gear, said roller having a pinion in mesh therewith, a plunger-rod pivotally connected with said roller, and a pivoted cylinder receiving said plunger-rod.

19. In a roller baling-machine, the combination with a compressing-roller in swinging supports, of a pair of united and communicating pivotal ram-cylinders, plunger-rods therein pivotally embracing opposite end portions of the roller-journals, and a water-column communicating with said cylinders.

20. In a roller baling-machine, a bodily-movable compressing-roller having a gear, and an alarm device having a vibratory arm projecting for engagement with the teeth of said gear at a predetermined position of the latter.

21. In a roller baling-machine, a bodily-movable compressing-roller having a gear, and an alarm device having a vibratory arm projecting for engagement with the teeth of said gear at a predetermined position of the latter and adjustable toward and from the same.

22. In a roller baling-machine, a central driving spur-gear, a swinging support concentric therewith, a compressing-roller journaled in said support and having a pinion in mesh with said spur-gear, a pivoted ram-cylinder, a plunger-rod pivotally connected with the said roller, an alarm-bell on the said cylinder, and a clapper device having an arm projecting for engagement with the said pinion when the same reaches a predetermined position, substantially as described.

23. In a roller baling-machine, a central driving spur-gear, a swinging support concentric therewith, a compressing-roller journaled in said support and having a pinion in mesh with said spur-gear, a pivoted ram-cylinder, a plunger-rod pivotally connected with the said roller, an alarm-bell on the said cylinder, and an adjustable clapper-lever pivoted on the cylinder and projecting for engagement with the said pinion when the same reaches a predetermined position, substantially as described.

In testimony whereof I affix my signature in presence of two witnesses.

JAMES JONES FAULKNER.

Witnesses:
J. L. RUDY,
JAS. COX.